US012523267B1

(12) United States Patent
Oberdorfer et al.

(10) Patent No.: US 12,523,267 B1
(45) Date of Patent: Jan. 13, 2026

(54) AIR DISC BRAKE TAPPET AND BRAKE PAD BACKING PLATE WITH DIFFERENTLY SIZED INTERFACE FEATURES

(71) Applicant: Knorr-Bremse AG, Munich (DE)

(72) Inventors: Erik W. Oberdorfer, Akron, OH (US); Richard L. Lantz, Clinton, OH (US); Brian Brancatelli, Fairview Park, OH (US); William Schell, Lorain, OH (US); Lonnie F. Cool, Olmsted, OH (US); Prasad Bejgamwar, Pune (IN); Juan Manuel Gil Montoya, Monterrey (MX); James A. Seaman, Avon, OH (US)

(73) Assignee: KB Intellectual Property GmbH & Co. KG, Pullach (DE)

( * ) Notice: Subject to any disclaimer, the term of this patent is extended or adjusted under 35 U.S.C. 154(b) by 0 days.

(21) Appl. No.: 19/251,174

(22) Filed: Jun. 26, 2025

(30) Foreign Application Priority Data

Apr. 25, 2025 (IN) .............................. 202541040298

(51) Int. Cl.
 *F16D 65/095* (2006.01)
(52) U.S. Cl.
 CPC ........ *F16D 65/095* (2013.01); *F16D 2250/00* (2013.01)
(58) Field of Classification Search
 CPC ............................. F16D 65/095; F16D 2250/00
 See application file for complete search history.

(56) References Cited

U.S. PATENT DOCUMENTS 3,422,935 A 1/1969 House
3,708,043 A 1/1973 Rath et al.
(Continued)

FOREIGN PATENT DOCUMENTS

CN 113677908 A 11/2021
CN 114263694 A 4/2022
(Continued)

OTHER PUBLICATIONS

Air Disc Brakes—Calipers, Rotors, Pads & Chambers; product brochure; Pro-Par™ OEM Heavy Duty Parts; downloaded from the Internet on Sep. 22, 2025 at https://www.aurorapartstogo.com/myaurora/drl/1982%20-%20C_3_1_fakepath_1_Pro-Par_AdSlick_AirDiscBrakesAll11-23.pdf; Aurora Parts & Accessories LLC; 2023; 4 pages.

(Continued)

*Primary Examiner* — Pamela Rodriguez
(74) *Attorney, Agent, or Firm* — Crowell & Moring LLP

(57) ABSTRACT

Recess and protrusion features on a brake pad backing plate and an air disc brake tappet create a unique interface that keys the backing plate for use with the tappet. If the backing plate and/or tappet move during braking, the force applied by the protrusion of the tappet against the inner wall of the recess, or vice versa, can cause stress or damage to the backing plate, tappet, and/or other parts of the braking system. To accommodate such movement, the inner dimensions of the recess can be made greater than the outer dimensions of the protrusion. In one embodiment, the minimum dimensions of the recess are determined from a stack-up of tolerances of various components in the braking system. In another embodiment, maximum dimensions of the recess are determined to avoid overlapping step-down transitions in the backing plate and tappet during braking.

18 Claims, 10 Drawing Sheets

(56) References Cited

U.S. PATENT DOCUMENTS

| | | | |
|---|---|---|---|
| 4,289,216 | A | 9/1981 | Shirai et al. |
| 4,533,025 | A | 8/1985 | Carré |
| 5,022,500 | A | 6/1991 | Wang |
| 5,074,578 | A | 12/1991 | Grove et al. |
| 5,515,948 | A | 5/1996 | Gilliland |
| 6,269,914 | B1 | 8/2001 | Angerfors |
| 6,273,220 | B1 | 8/2001 | Uhlig |
| 8,717,159 | B2 | 5/2014 | Todd et al. |
| 8,936,138 | B2 | 1/2015 | Morris et al. |
| 9,358,961 | B2 | 6/2016 | Pahle |
| 10,316,916 | B2 | 6/2019 | Fischl |
| 10,746,242 | B2 | 8/2020 | Shah et al. |
| 10,801,569 | B2 | 10/2020 | Mcginn et al. |
| 10,851,857 | B2 | 12/2020 | Baumgartner |
| 11,230,275 | B2 | 1/2022 | Smith |
| 11,971,075 | B1* | 4/2024 | Oberdorfer ........... F16D 65/183 |
| 2006/0289251 | A1 | 12/2006 | Demorais et al. |
| 2007/0209891 | A1* | 9/2007 | Stensson ............... F16D 65/183 188/247 |
| 2008/0271963 | A1 | 11/2008 | Macke et al. |
| 2013/0341135 | A1* | 12/2013 | Arbesman ............. F16D 65/092 188/250 H |
| 2015/0285321 | A1 | 10/2015 | Maehara et al. |
| 2017/0074338 | A1 | 3/2017 | Fischi |
| 2017/0114850 | A1 | 4/2017 | Malki |
| 2019/0203785 | A1 | 7/2019 | Baumgartner |
| 2024/0392850 | A1 | 11/2024 | Stoeger |
| 2024/0426358 | A1* | 12/2024 | Oberdorfer ........... F16D 65/183 |

FOREIGN PATENT DOCUMENTS

| | | |
|---|---|---|
| CN | 115467916 A | 12/2022 |
| DE | 42 30 005 B4 | 3/2005 |
| DE | 10 2007 023 191 B4 | 12/2008 |
| DE | 10 2013 013280 B3 | 2/2015 |
| DE | 10 2021 120 048 A1 | 2/2023 |
| DE | 10 2022 107 615 A1 | 10/2023 |
| DE | 10 2005 047871 B4 | 4/2025 |
| EP | 1633992 B1 | 4/2009 |
| EP | 4563840 A1 | 6/2025 |
| JP | 2010144767 A | 7/2010 |
| KR | 10-0572631 B1 | 9/2005 |
| KR | 10-2021-0085405 A | 7/2021 |
| WO | WO 1999/05428 A1 | 2/1999 |
| WO | WO 2011/042280 A1 | 4/2011 |
| WO | WO 2013/045555 A1 | 4/2013 |
| WO | WO 2022/139703 A2 | 6/2022 |
| WO | WO 2023/052323 A1 | 4/2023 |

OTHER PUBLICATIONS

Non-final Office Action dated Sep. 22, 2025 for U.S. Appl. No. 18/213,515.

U.S. Appl. No. 18/213,515, filed Jun. 23, 2023, entitled "Air Disc Brake Tappet and Brake Pad Backing Plate with Interface Features."

U.S. Appl. No. 18/213,676, filed Jun. 23, 2023, entitled "Air Disc Brake Tapered Tappet for Brake Pad Wear Reduction."

ECO Disc TSB Caliper; Workshop Service Sheet, version 3; BPW Limited; Dec. 2021; one page.

Calipers—Wabco—PAN™ 17 Air Disc Brake, 6 15/16"; Meritor Part No. 640 175 940 2; PB-146; MeritorPartsXpress.com; Aug. 2022; 2 pages.

640-225-926-2 Air Disc Brake—Pressure Plate Kit; Meritor Parts Xpress web page; prior to Jun. 2023; 1 page.

"Bendix® ADB22X®, ADB22®-V & ADB22X®—LT Air Disc Brakes"; Service Data Sheet SD-23-7541; Bendix Commercial Vehicle Systems LLC; Aug. 2021; 48 pages.

"Meritor® EX+™ LS Air Disc Brakes"; product brochure; Meritor Heavy Vehicle Systems, LLC; Oct. 2019; 2 pages.

"Wabco MAXXUS"; two color images; prior to Ju. 2023; 2 pages.

"Meritor Single Piston"; two color images; prior to Jun. 2023; 1 page.

"Wabco MAXUS 2.0"; three color images; prior to Jun. 2023; 2 pages.

TSB Technical Information: Assessment of lining ruptures; BPW-TI-Belag TSB 39312201e; BPW Bergisch Achsen Kimmanditgesellschaft; Dec. 2021; 4 pages.

"Brake pad wear indicator: older-style metal tabs will squeal when your pads wear down"; website page; downloaded from the Internet on Jul. 3, 2025 at https://www.carlsonqualitybrakeparts.com/when-to-Change-brake-pads-brake-sensors/brake-pad-wear-indicator-metal-tab-sguealer/; Carlson® Quality Brake Parts; 2025; 6 pages.

Pons, Marc; "A Quick Guide to Brake Wear Indicators"; website page; downloaded from the Internet on Jul. 3, 2025 at https://www.Chapelhilltire.com/what-are-brake-wear-indicators/; Chapel Hill Tire Co.; 2025; 5 pages.

Muscoplat, Rick; "How Brake Pad Wear Indicators Work: A Guide"; website page; downloaded from the Internet on Jul. 3, 2025 at https://ricksfreeautorepairadvice.com/how-brake-pad-wear-indicators-work-a-guide/; Ricks Free Auto Repair AdVice; 2022; 4 pages.

Non-final Office Action dated Oct. 30, 2023 for U.S. Appl. No. 18/213,447.

International Search Report mailed Nov. 4, 2024 for International Application No. PCT/US2024/029669.

Written Opinion mailed Nov. 4, 2024 for International Application No. PCT/US2024/029669.

International Search Report mailed Oct. 11, 2024 for International Application No. PCT/US2024/029672.

Written Opinion mailed Oct. 11, 2024 for International Application No. PCT/US2024/029672.

International Search Report mailed Oct. 11, 2024 for International Application No. PCT/US2024/029666.

Written Opinion mailed Oct. 11, 2024 for International Application No. PCT/US2024/029666.

Non-final Office Action dated Oct. 9, 2025 for U.S. Appl. No. 18/213,676.

\* cited by examiner

AIR DISC BRAKE TAPPET AND BRAKE PAD BACKING PLATE WITH DIFFERENTLY SIZED INTERFACE FEATURES

CROSS-REFERENCE TO RELATED APPLICATION

This application claims priority to Indian provisional patent application No. 202541040298, filed Apr. 25, 2025, which is hereby incorporated by reference.

BACKGROUND

In an air disc brake system, when the brakes are applied, air pushes one or more tappets against a backing plate of an inner brake pad, which moves the inner brake pad in contact with a rotor coupled with a wheel. During braking, the brake pad is applied against the rotating rotor it to create a braking force.

SUMMARY

The following embodiments relate to an air disc brake tappet and brake pad backing plate with differently sized interface features. Recess and protrusion features on a brake pad backing plate and an air disc brake tappet create a unique interface that keys the backing plate for use with the tappet. If the backing plate and/or tappet move during braking, the force applied by the protrusion of the tappet against the inner wall of the recess, or vice versa, can cause stress or damage to the backing plate, tappet, and/or other parts of the braking system.

In one embodiment, an air disc brake backing plate is provided comprising: a friction material coupled with a first side of the air disc brake backing plate; and a recess formed in a second side of the air disc brake backing plate, wherein the recess is sized larger than an outer perimeter of a protrusion on a tappet of a braking system.

In another embodiment, a method is provided for manufacturing an air disc brake backing plate for use in a braking system comprises a tappet having a protrusion. The method comprises: determining a minimum size of a recess to manufacture in the air disc brake backing plate to accept the protrusion, wherein the minimum size is determined from predicted movement of the air disc brake backing plate and/or tappet during braking, such that an inner wall of the recess will not contact the protrusion as the air disc brake backing plate and/or tappet move during braking; and creating the recess in the air disc brake backing plate with the determined minimum size.

In yet another embodiment, an air disc brake backing plate is provided that is manufactured using the above method.

Other embodiments are possible, and each of the embodiments can be used alone or together in combination.

DETAILED DESCRIPTION

General Overview of an Air Disc Brake System

Figure 1:
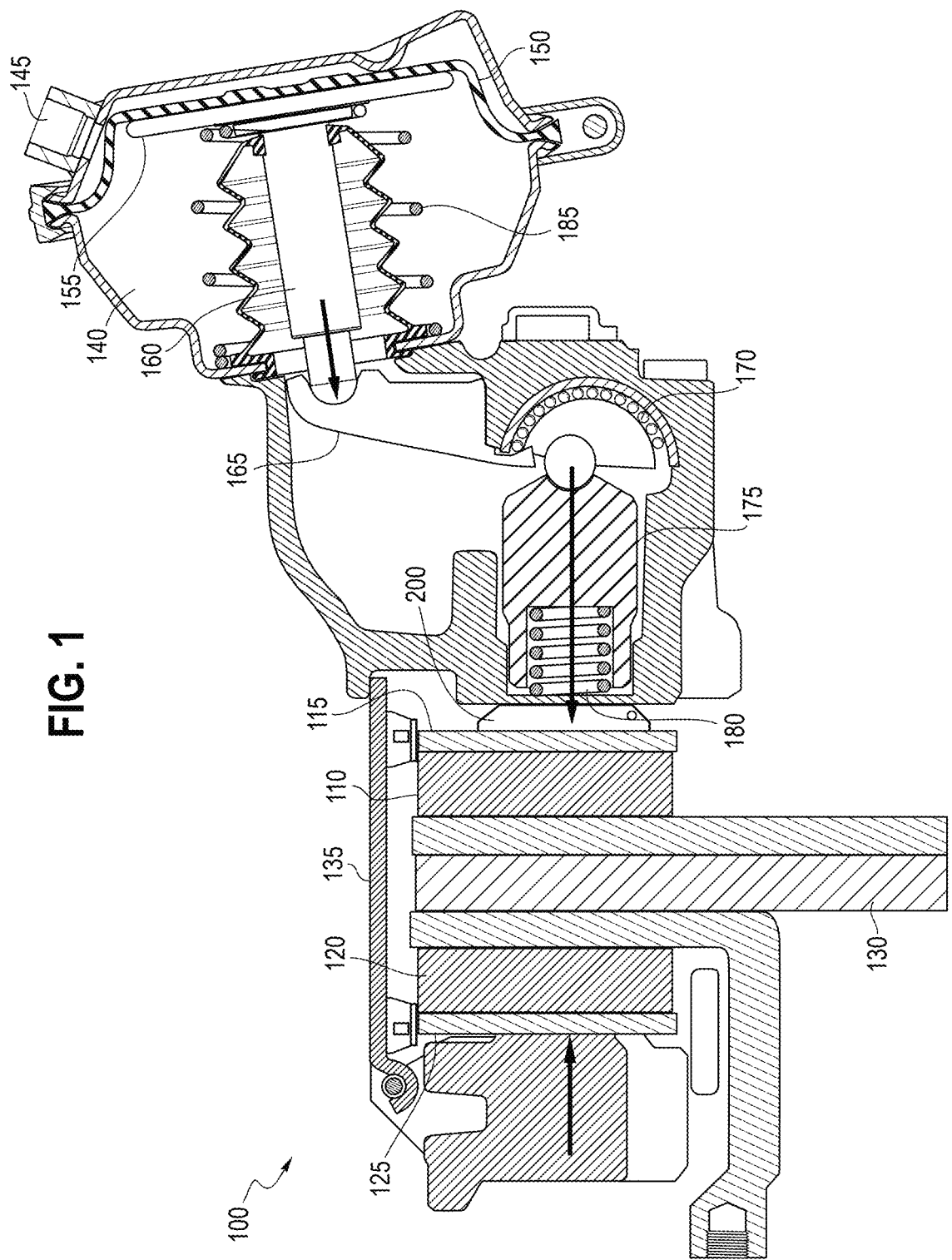
FIG. 1 is an illustration of an air disc brake system an embodiment.

Turning now to the drawings, FIG. 1 is an illustration of an air disc brake system 100 of an embodiment. As shown in FIG. 1, this system 100 comprises an inner brake pad 110 and an outer brake pad 120 in proximity to a brake rotor 130 coupled with a wheel of a vehicle. Each brake pad 110, 120 comprises a friction material (e.g., a mixture of different particles of material) configured to slow the rotation of the rotor 130 when the brake pads 110, 120 press against the rotor. Each brake pad 110, 120 is bonded to a respective backing plate 115, 125, which can be made from cast iron or steel, for example. A floating caliper 135 couples the two brake pads 110, 120.

In operation, when the vehicle brakes are applied (e.g., when a driver presses a brake pedal or an automated driving system generates an electronic signal to apply the brakes), air enters a service brake chamber 140 through a supply port 145, applying pressure within a diaphragm 150. The pressure expands the diaphragm 150, thereby applying force to and moving a pressure plate 155 and a pushrod 160 forward. The pushrod 160 acts against a cup in an internal lever 165, which pivots on an eccentric bearing 170 to move a bridge 175. Moving against a return spring 180, the bridge 175 transfers the motion to a support memory (e.g., a threaded tube, which is not shown) and a tappet 200, which contacts the inner brake pad's backing plate 115 to move the inner brake pad 110 into contact with the rotor 130. Further movement of the bridge 175 forces the floating caliper 135 (sliding on two stationary guide pins (not shown)) away from the rotor 130. That, in turn, pulls the outer brake pad 120 into the rotor 130. The clamping action of the brake pads 110, 120 on the rotor 130 applies braking force to the wheel. When the vehicle brakes are released, the air pressure in the service brake chamber 140 is exhausted, and the return spring 180 in the bridge 175 and a return spring 185 in the service brake chamber 140 return the air disc brake to a neutral, non-braked position. It should be understood that this is merely an example and that other configurations can be used.

As noted above, when the brakes are applied, air forces the tappet 200 (coupled with a support, such as a threaded tube) into contact with the inner brake pad's backing plate 115. The combination of the tappet 200 and threaded tube may sometimes be referred to herein a plunger or piston, and the tappet 200 may sometimes be referred to herein as a pressure plate. A single tappet 220 is shown in this illustration, but it should be understood that more than one tappet can be used. For example, in a two-tappet braking system, a pair of spaced-apart tappets (and threaded tubes) can be used to distribute the applied force over a large area of the backing plate 115.

U.S. Pat. No. 11,971,075, which is hereby incorporated by reference, describes embodiments of tappets and backing plates that can be used with the embodiments presented herein.

Example Tappets and Backing Plates with Interfacing Features

Figure 2:
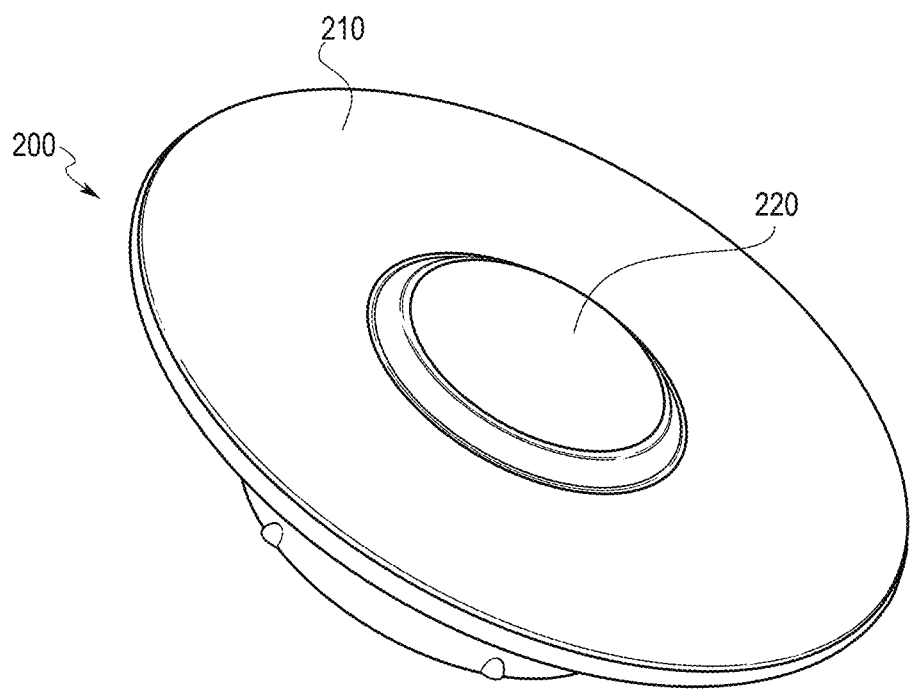
FIG. 2 is an illustration of a tappet of an embodiment.
Figure 3:
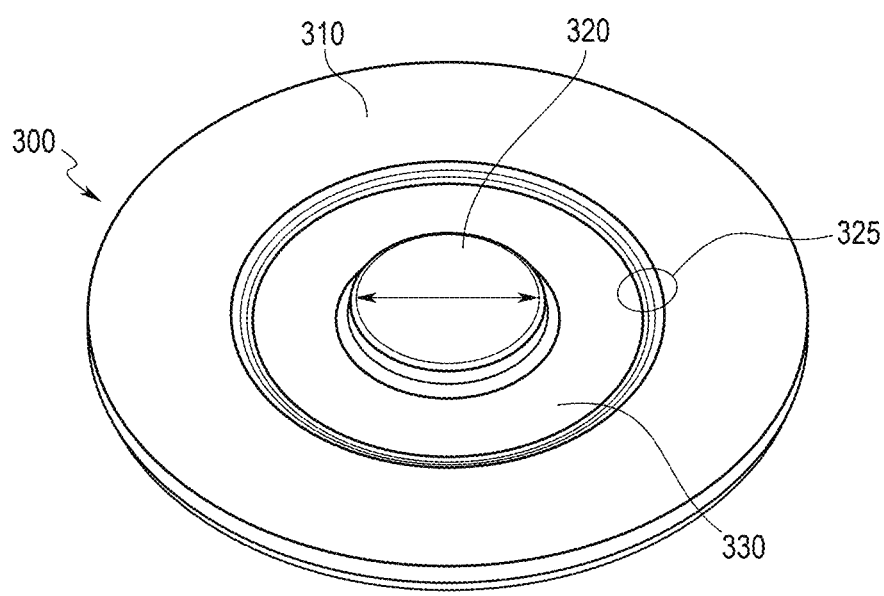
FIG. 3 is an illustration of a tappet of an embodiment with a stepped-down portion.

Turning again to the drawings, FIG. 2 is an illustration of a tappet 200 of an embodiment. The top surface of the tappet 200 comprises a backing plate engagement portion 210 (the portion of the tappet 200 that pushes against the backing plate during braking) and a protrusion 220 (sometimes referred to herein as a feature or a pin). The bottom surface of the tappet 200 can be coupled with a support, such as a threaded tube (not shown). In another embodiment (shown in FIG. 3), the backing plate engagement portion 310 of the tappet 300 takes the form of an annual ring, and the protrusion 320 is located in a stepped-down portion 330 of the tappet 300. A transition 325 exists between the backing plate engagement portion 310 and the stepped-down portion 330 of the tappet 300. This transition 325 can be abrupt (e.g., at a 90-degree angle) or gradual. The tappet 300 in FIG. 3 will be used in the below examples, but it should be understood that the tappet 200 in FIG. 2 (or other appropriate tappet designs) can be used.

Figure 4:
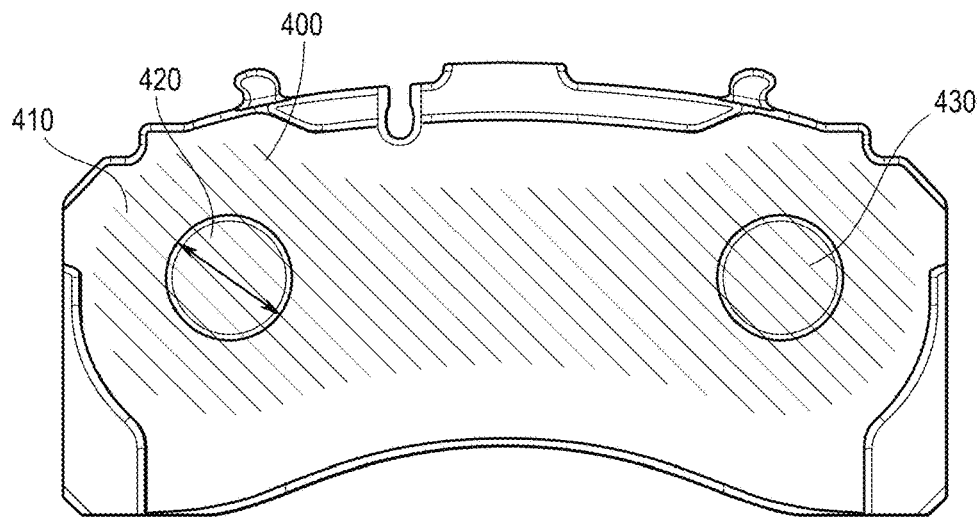
FIG. 4 is an illustration of a backing plate of an embodiment.

As shown in FIG. 4, the protrusion 320 of the tappet 300 is designed to be received by a recess 420 (sometimes referred to herein as a feature) in a backing plate 400. The backing plate 400 in this example has two recesses for use with a two-tappet system, but fewer or more recesses/tappets can be used. Further, the location of the recess(es)/tappet(s) can vary. For example, in a single-tappet system, the recess/tappet can be centered in the backing plate to provide an equal distribution of force.

In this embodiment, the protrusion 320 in the tappet 300 requires a certain type of backing plate (one with a corresponding recess). This provides a unique interface feature, such that the backing plate 400 is keyed/registered for use with the tappet 300. In this way, only a backing plate with a suitably sized recess would work with the tappet (and backing plates without a suitably sized recess would not work with the tappet).

Another advantage of using an interface feature between the tappet and backing plate is that it can prevent misalignment of the brake pad on the backing plate. During installation of an inboard brake pad in some prior backing plates, it is possible that the friction material side of the pad can be mis-installed (flipped around backwards) while still fitting into the brake. Here, the friction material would be against the flat face(s) of the tappet(s) instead of the rotor, which can result in less or no brake torque generation.

Also, in the case of high brake pad friction wear, the inboard brake pad can lose contact with the brake carrier because the amount of wear reduces the overall thickness of the brake pad (backing plate thickness plus remaining friction thickness) to a low level. When this occurs, the inboard brake pad might travel into the space between the carrier and the rotor and wedge, thereby causing wear or damage to the brake. In other cases, the brake pad might actually become loose inside of the brake or potentially fall out. Using an interface feature between the tappet and backing plate can reduce the potential for this to happen due to a tighter fit between the raised feature or features on the tappet and the mating feature or features on the pad backing plate when compared to designs where the edge of the tappet and the raised edge of backing plate are the "stop."

So, using an interface feature between the tappet and backing plate can allow for an inboard pad to be installed properly on the inboard side to avoid backwards placement (where the friction material would face the tappets). Same with the outboard pad and outboard side. (Doing this can require an interface feature or features to be present on the outboard side of the brake caliper.) Further, if the brake pad is installed backwards on the inboard side, the outboard pad would not be able to be installed. So, the interface feature provides a "poka yoke" quality.

Another advantage of using an interface feature between the tappet and backing plate is in the case of a North American (or other countries) federal mandate (referred to as "N-Level") for copper-free friction material brake pad usage. Here, the friction material content must be copper free or nearly free to be used on public roadways due to environmental or other governmental regulations. In such a case, the interface features on the tappet and brake pad backing plate provide a way to ensure that only copper-free brake pads get used in all cases (OEM and aftermarket replacement). Without the interface features, it might be possible for pads with friction materials that are not copper free to fit, thereby violating environmental regulations in North America or in other countries that have a similar mandate.

Examples of Accommodating Movement of the Tappet and/or Backing Plate

In operation, when the protrusion 320 of the tappet 300 is received in the recess 420 of the backing plate 400, the backing plate engagement portion 310 of the tappet 300 would contact a corresponding portion 410 in the backing plate 400 to push the backing plate 400 and engage the brake. In some embodiments the height of the protrusion 320 on the tappet 300 is less than the height of the backing plate engagement portion 310, so the top of the protrusion 310 does not contact the backing plate 400. In other embodiments, the height of the protrusion 320 is at least the height of the backing plate engagement portion 310, so the top of the protrusion 310 contacts the backing plate 400.

In some embodiments, the recess 420 in the backing plate is sized to form fit with the protrusion 320 of the tappet 300 (i.e., the inner dimensions of the recess 420 equal (or about equal) the outer dimension of the protrusion 320). However, there can be movement of the backing plate 400 and/or tappet 300 during braking, and a force applied by the protrusion 320 against the inner wall of the recess 420, or vice versa, can cause stress or damage to the backing plate 400, tappet 300, and/or other parts of the braking system. That is, contact/loading of the tappet on the backing plate, or vice versa, can causes damage in a dynamic state.

Figure 5:
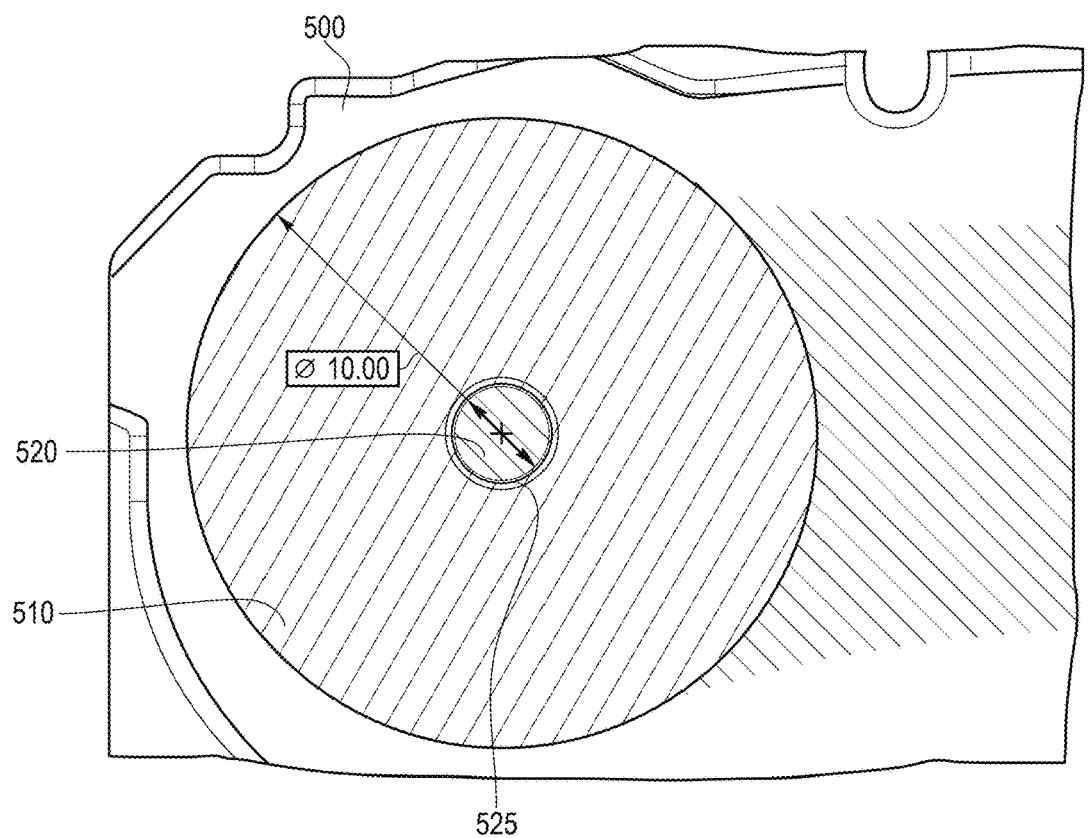
FIG. 5 is an illustration of an example minimum recess dimension of a backing plate of an embodiment.

To account for this, in some embodiments, the inner dimensions of the recess 420 are greater than the outer dimensions of the protrusion 320 to provide some "play" to accommodate movement. For example, the backing plate 500 in FIG. 5 have a circular recess 520 with a diameter is that slightly larger than the diameter of the protrusion of the tappet (e.g., 10.1 mm versus 10 mm). While this design provides a relatively large area 510 to contact with the backing plate engagement portion of the tappet to engage the brake, it provides as relatively small clearance 525 (e.g., 0.1 mm) for movement of the protrusion and/or backing plate 500 during braking, which may not be sufficient to accommodate such movement. In this example, 0.1 mm is the smallest gap permitted to allow installation in a static or dynamic condition with a nominal dimensional condition for this design.

Figure 6A:
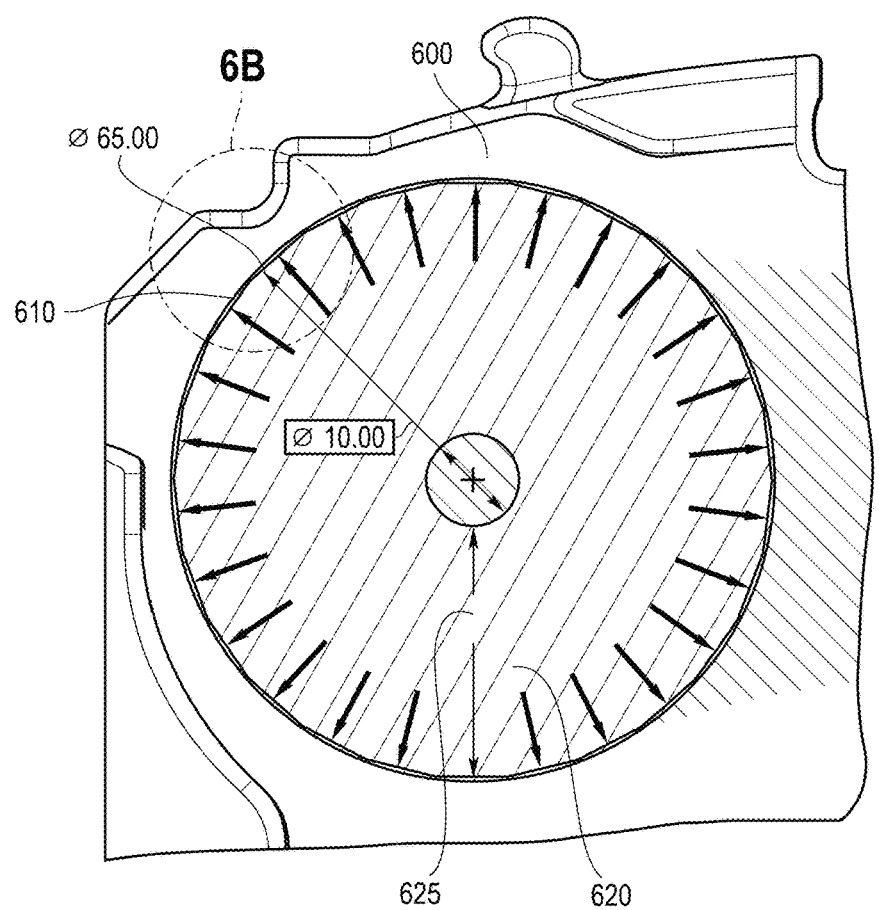
FIGS. 6A and 6B are illustration of an example maximum recess dimension of a backing plate of an embodiment.
Figure 6B:
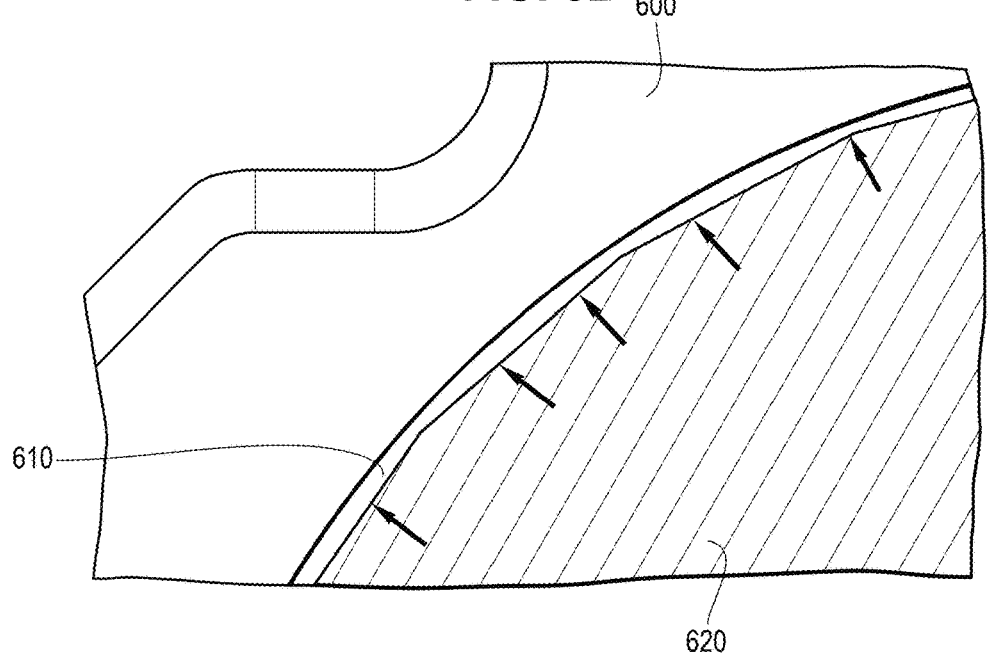

As another example, the backing plate 600 in FIGS. 6A and 6B has a circular recess 620 that is almost as large as the outer diameter of the tapper (e.g., 64.9 mm versus 65 mm). In this example, this shape is the largest shape that can be permitted to allow installation in the static or dynamic condition with a nominal dimensional condition for this design. While this design provides the maximum clearance 625 for movement of the protrusion and/or backing plate 600 during braking, it provides a relatively small area 610 to contact the backing plate engagement portion of the tappet to engage the brake. Such a small area may not be sufficient to provide a threshold clamping force transmission to the backing plate 600 to brake the vehicle.

Example Methods for Calculating Minimum and/or Maximum Dimensions of the Recess in the Backing Plate To address the above issues, in one embodiment, minimum dimensions of the inner perimeter of the recess in the backing plate are determined using a predicted maximum movement of the backing plate and/or tappet (and, thus, the protrusion on the tappet) during braking. From this predicted movement, the minimum size of the recess in the backing plate can be determined to ensure that the protrusion of the tappet will not contact the inner perimeter of the recess in the backing plate during braking.

Figure 7:
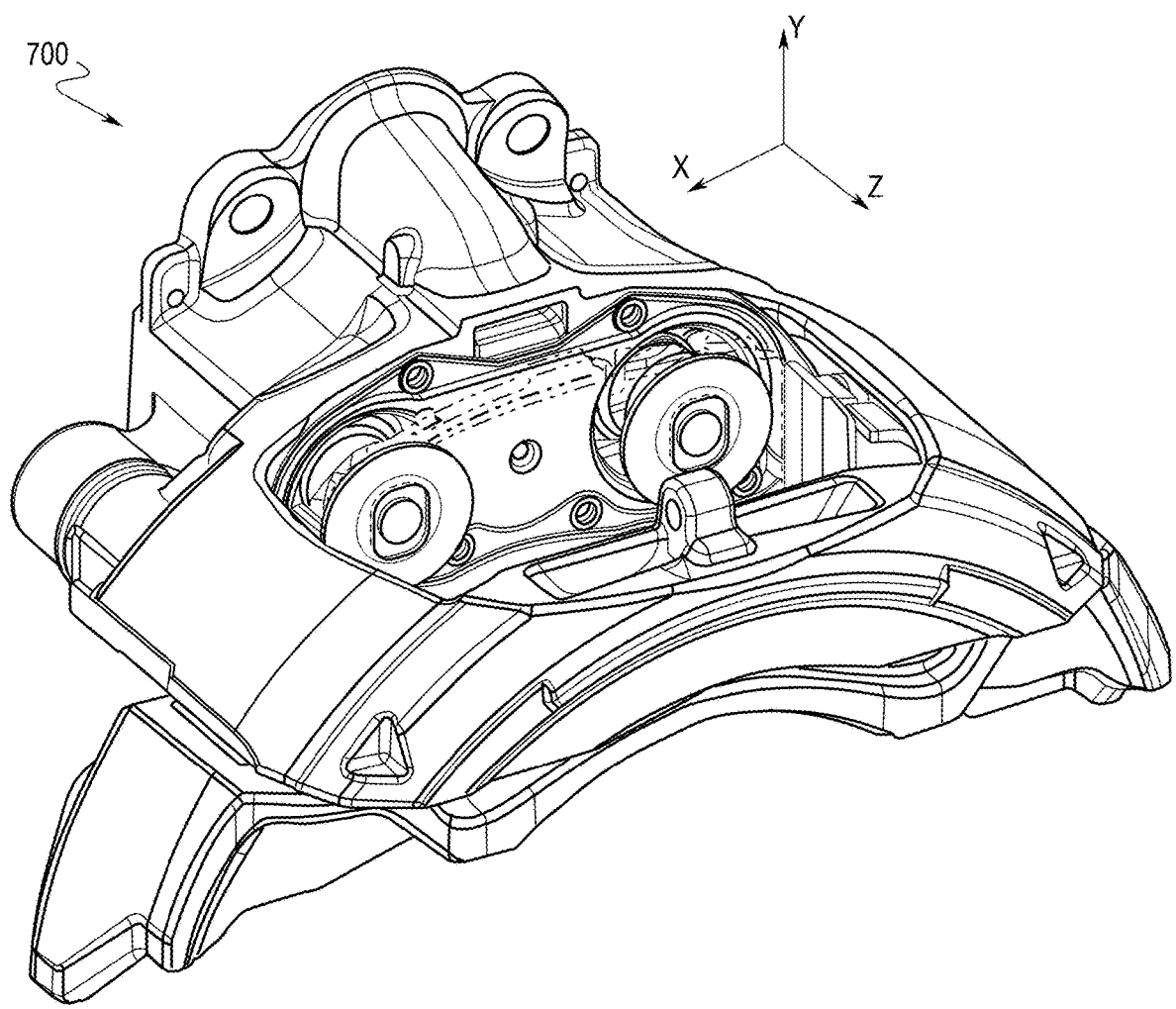
FIG. 7 is an illustration of a braking assembly of an embodiment.

Any suitable method can be used to make that prediction. In one embodiment, a CETOL 6 Sigma analysis is used to model tolerances of various components in a braking system that can cause the backing plate and/or tappet to move during braking. FIG. 7 is an illustration of a braking system that shows various components that can be accounted for in this analysis. This analysis can be performed by one or more processors that are configured to execute computer-readable program code having instructions (e.g., modules, routines, sub-routine, programs, applications, etc.) that, when executed by the one or more processors, individually or in combination, cause the one or more processors to perform the analysis. The computer-readable program code can be stored in one or more non-transitory computer-readable storage medium (memories), such as, but not limited to, volatile or non-volatile memory, solid state memory, flash memory, random-access memory (RAM), read-only memory (ROM), programmable read-only memory (PROM), erasable programmable read-only memory (EPROM), electronic erasable programmable read-only memory (EEPROM), and variants and combinations thereof. Alternatively, a purely-hardware implementation (e.g., an application-specific integrated circuit (ASIC)) can be used. The term "circuitry" will be used herein to broadly refer to any appropriate decision-making device, such as, but not limited to, a processor, a microprocessor, an ASIC, an analog circuit, etc.

In one embodiment, the tolerance "stack-up" analysis is performed with the goal of finding the effect (in terms of distance from nominal) of the manufacturing and assembly tolerances in certain component(s) of the assembly with a defined reference frame. For the specific case of the tappet position analysis, the reference frame used can be the carrier, as this is the component that receives the brake pad backing plate and guides it in its position. The carrier horns' sides and bottom-machined surface are the initial point and reference of the analysis in one embodiment. The carrier interacts with the guide pins attached with the guide pin bolt making a face-to-face joint and allows some assembly tolerance in the diametric position between the two. Then, the guide pin slides into the bushings (long and short side) that is press fitted into the caliper guide bores. The caliper with its datums and reference system defines positions for two main components. One main component is the bridge which is guided by the machinings in the internal cavity of the caliper and also by an assembly tolerance that adds variability to analysis and creates a biased result, making the analysis more meaningful to one side as there is more variability in that specific side. The other main component is the lever installed inside the caliper and supported by the two shell bearings. The lever is in contact with the cylindrical pin that contacts the bridge defining its Z position and that cans affect rotation in the Y direction. The bridge is threaded inside the main holes and threaded tubes are installed there via thread. The tappet is installed to the tip of the threaded tube adding more assembly tolerances. as it is a rotating part. It should be noted that this is merely an example, and other/different component(s) can be used in the analysis.

To put the previous components into a tolerance analysis, all the tolerances from drawing and geometric dimensioning and tolerancing (GD&T) indications can be taken in account, as these tolerances can affect the size and sometimes position of the components, creating a chain that from the reference frame to the measuring point (center of the tappet) adds (and subtracts) the tolerance ranges from drawings and the assembly tolerances to find the dimensions between the tolerance frame and the measured point.

Figure 8:
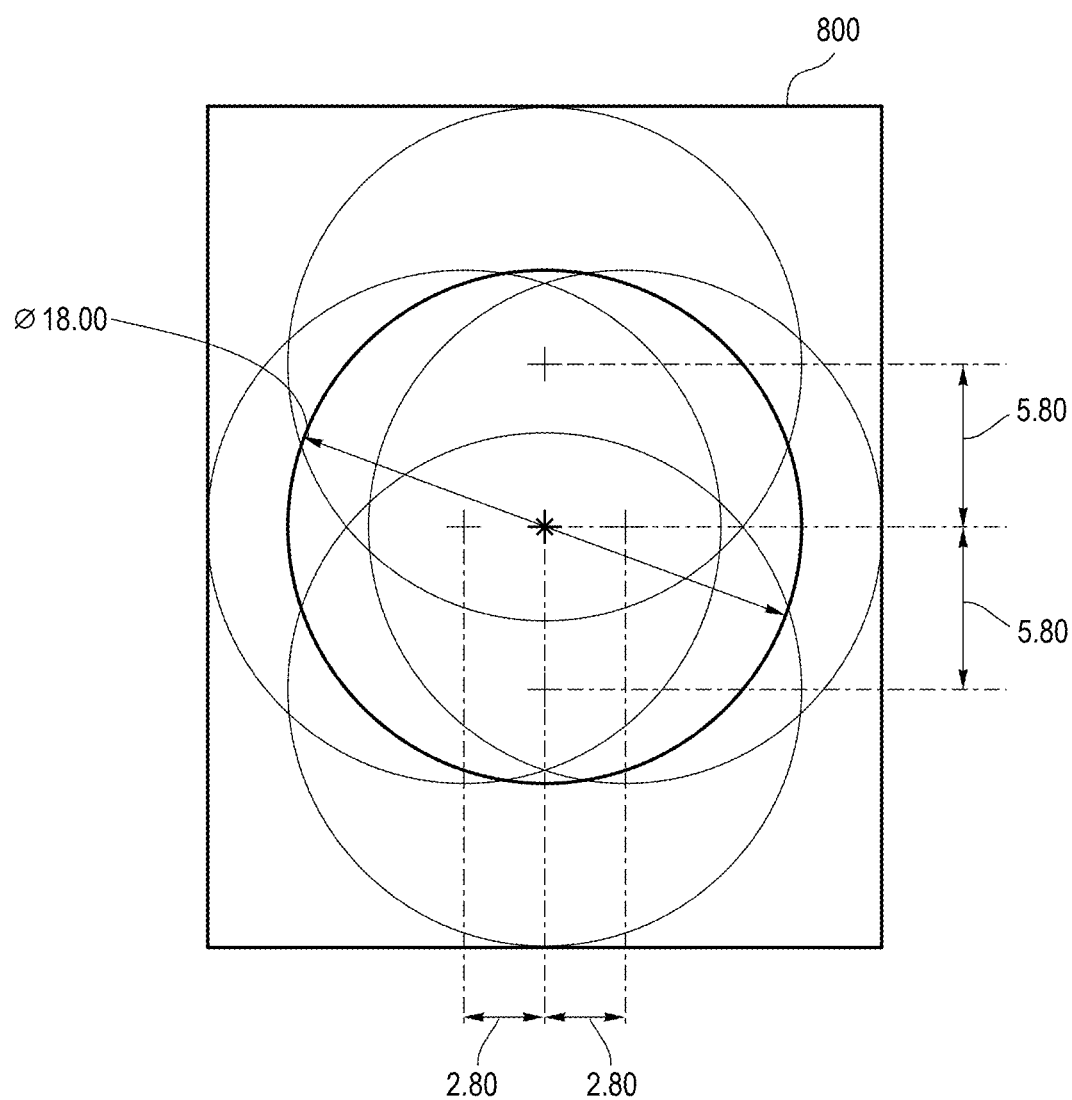
FIG. 8 is an illustration of a result of an analysis to determine a minimum recess dimension of a backing plate of an embodiment.
Figure 9A:
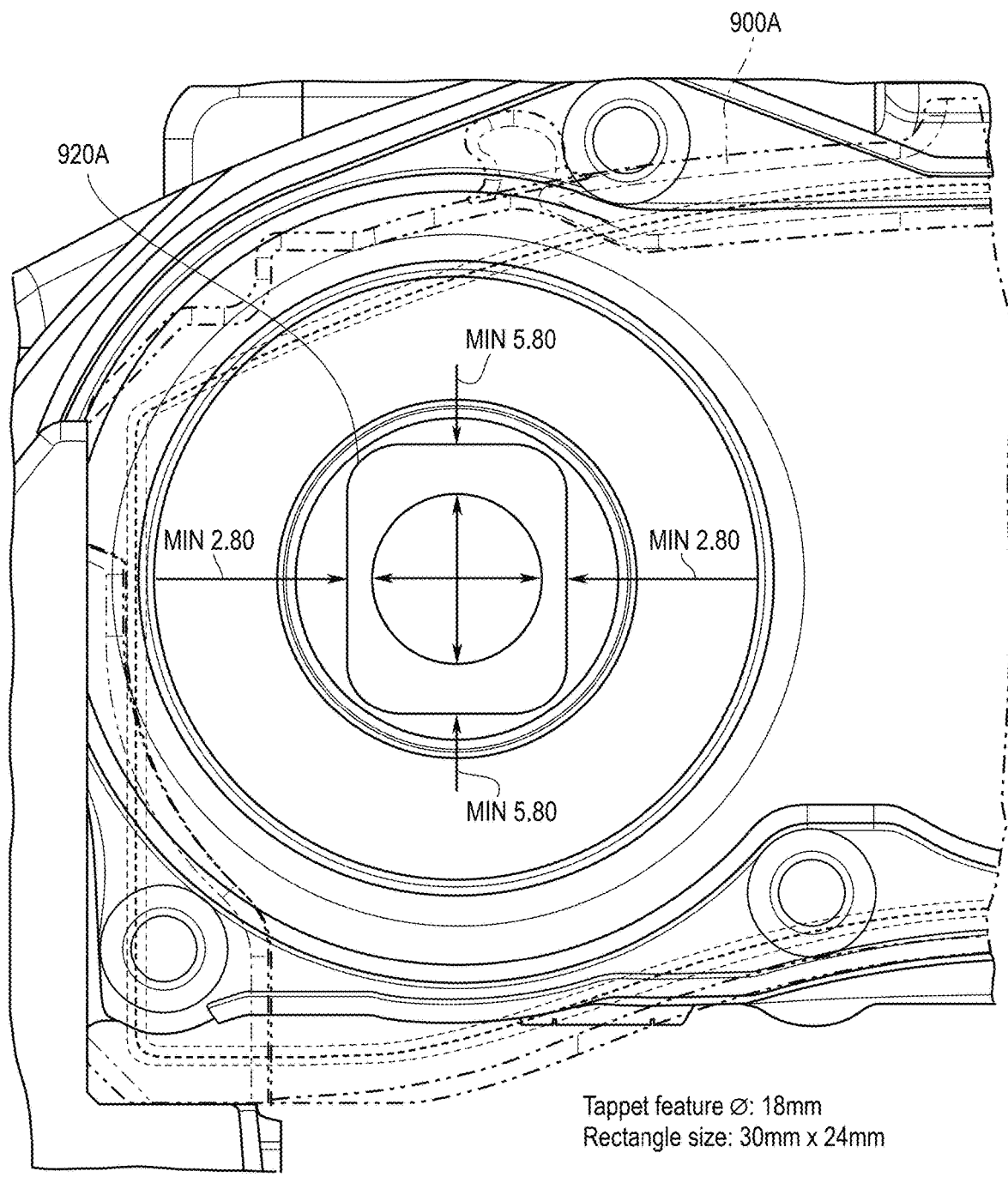
FIGS. 9A and 9B are illustrations of backing plates of an embodiment having recesses with minimum dimensions.

In one embodiment, the result of the analysis is a prediction of movement in the X and Y directions. In the example shown in FIG. 8, the analysis predicts a movement from the center point of the tappet (when at rest) in the X direction of 2.80 mm and a movement in the Y direction of 5.80 mm. This suggests that the recess in the backing plate should have a minimum size in the X direction of "2.80 mm plus the radius of the tappet protrusion" and a minimum size in the Y direction of "5.80 mm plus the radius of the tappet protrusion," both with respect to the center of the protrusion (assumed to be circular in this example) at its reference state of rest. These X and Y dimensions results in a rectangle 800. However, because the protrusion of the tappet is circular in this example, the corners of the rectangle can be rounded. This is shown in FIG. 9A, where the recess 920A in the backing plate 900A has rounded corners. (As used herein, the phrase "rectangular in shape" can be a rectangle with square or rounded corner(s).)

Figure 9B:
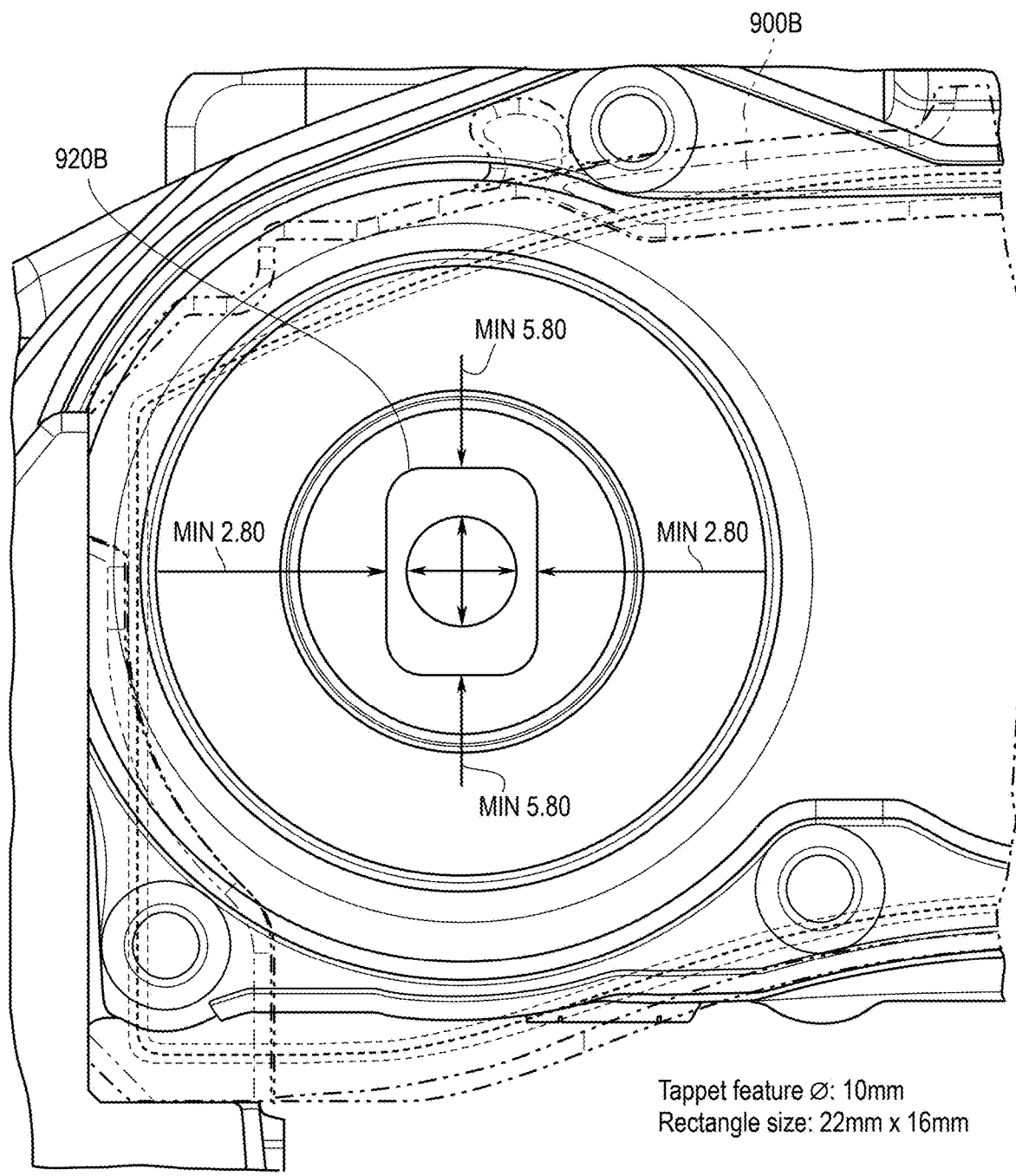

In the example shown in FIG. 9A, the diameter of the protrusion on the tappet is 18 mm. So, given the minimum X and Y dimensions noted above, the resulting rectangle size (on its non-rounded edges) is 30 mm×24 mm. This analysis also applies to other protrusion diameters. For example, as shown in FIG. 9B, if the diameter of the protrusion on the tappet is 10 mm, the resulting rectangle sized (on its non-rounded edges) is 22 mm×16 mm, based on the minimum X and Y dimensions noted above. Further, tolerances can be built into the analysis to ensure there is some space between the outer perimeter of the protrusion and the inner perimeter of the recess at maximum movement of the tappet and/or backing plate. In the examples shown in FIGS. 9A and 9B, the left, right, up, and down tolerances can be 0.319 mm, 1.179 mm, 3.779 mm, and 0.492 mm, respectively.

Figure 10:
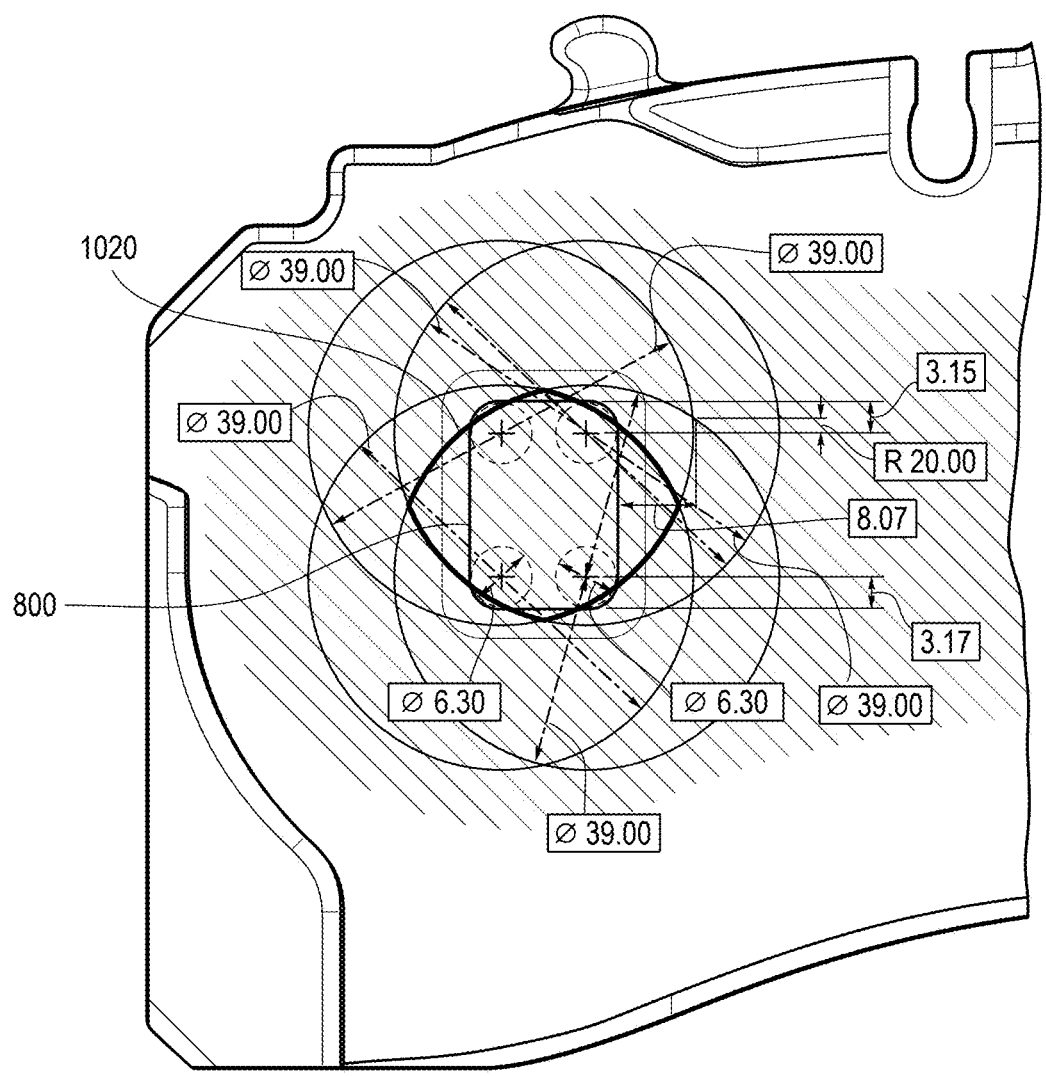
FIG. 10 is an illustration of a result of an analysis to determine a maximum recess dimension of a backing plate of an embodiment.

Maximum dimensions of the recess can also be specified. For example, maximum dimensions can be calculated to provide a maximum threshold force transmission to the backing plate by the tappet for braking the vehicle. As another example, in the case of a tappet 300 with a stepped-down portion 330 (see FIG. 3), the maximum dimensions of the recess can be calculated to avoid the transition 325 in the tappet 300 to the stepped-down portion 330 from overlapping the transition in the backing plate to the recess, as movement of those two transitions against each other can interfere with braking performance and/or cause damage to the tappet 300 and/or backing plate. The maximum dimensions of the recess to prevent such overlapping can be determined in any suitable way. For example, as shown in FIG. 10, mathematical modeling can be performed using one or more processors to generate a simulation in which four circles with diameters matching the tappet feature diameters (center feature locations as well as tappet internal diameter) are made tangent to the vertical and horizontal lines of the minimum recess rectangle 800 (i.e., the centers of the four circles are placed appropriately in corresponding locations in each of the four corners of the rectangle 800). The resulting overlap of the circles (tappet internal diameter or appropriate size) is the maximum size of the recess to avoid the transitions in the tappet 300 and backing plate from overlapping. In this example, the maximum size of the recess takes the form of an eye-shape 1020.

Figure 11:
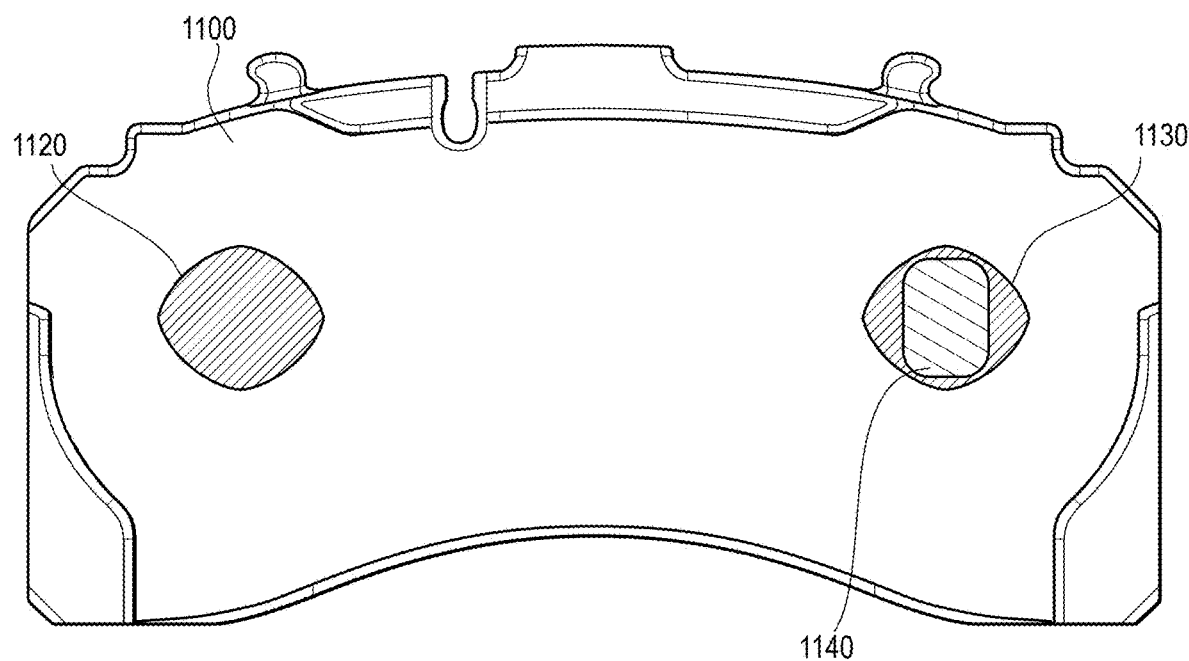
FIG. 11 is an illustration of backing plate of an embodiment showing example minimum and maximum recess dimensions.

FIG. 11 shows the backing plate 1100 that results from this analysis with two eye-shape recesses 1120, 1130. As illustrated by rectangle 1140, which is present just for illustration and is not a separate recess, the eye-shape recess 1130 generated by the above analysis is large enough to encompass the minimum dimensions of the recess 1130, per the other analysis described above.

There are several alternatives that can be used with these embodiments. For example, instead of using the above analyses for the minimum and/or maximum dimensions of the recess in the backing place, other methods can be used. Also, while the protrusion in the above examples was circular, the protrusion can take any other shape, such as, but not limited to, "classical" shapes (e.g., a rectangle, a square, an octagon, etc.) or "arbitrary" shapes (e.g., a "swoosh"). Further, while the protrusion in the above examples was centered in the tappet (here, concentric with the circular tappet perimeter), the protrusion can be located in another other location on the tappet. However, centrally locating the protrusion can avoid the need to "clock" the tappet (i.e., rotating the tappet so the protrusion aligns with the recess in the backing plate), which may be desirable for manufacturability or serviceability reasons. Also, while the above examples had the protrusion in the tappet and the recess in the backing plate, these embodiments can be used with the opposite arrangement. Further, in braking systems that use more than one tappet, all the tappets can be configured similarly (e.g., all with circular protrusions) or differently (e.g., one with a circular protrusion and another with a rectangular protrusion, one with a protrusion and another with a recess, etc.).

Additional Information and Examples

In prior braking systems, the basically flat interface area between the tappet and the backing plate allows the transmission of clamping force between the caliper and the brake pad. In one embodiment, the non-flat interface feature took the form of a centralized raised feature. Using a non-flat interface feature can permit only genuine brake pads to fit into a brake, as well as provide several other advantages, including, for example, providing a "poka yoke" feature where a user would not be able to install a brake pad backwards (i.e., the friction side of pad cannot be installed against tappets), and providing improved pad retention within the brake in cases where high frictional wear are encountered. Another advantage relates to highly worn pad/or abuse situations. When significant pad friction wear occurs in prior braking systems or in cases of this plus abuse, the inboard brake pad can lose contact between the vertical edge of the trailing side backing plate abutment surface and the corresponding contact surface on the brake carrier horn. In this situation, the inboard brake pad can slide between the inner surface of the brake carrier and the brake rotor and potentially get wedged. In this situation, the pad can migrate into this area until the side edge/outer diameter of the tappet and the raised side edge of the backing plate contact (if the backing plate has a raised edge in its design; if the backing plate is completely flat, this stop does not exist, and the situation can become even worse). This then stops the pad from moving further in between the rotor/carrier. This type of wedging can lead to carrier or other component damage (breakage). With these embodiments, the total amount of movement of a worn pad into this area of the brake is reduced. Here, the raised feature(s) on the tappet(s) and the matching feature(s) on the backing plate will touch/stop the pad from moving because the amount of space between the features on the tappet and backing plate are less than the space between the side edge/outer diameter of the tappet and the raised side edge of the backing plate.

In some of the examples, the interface between the tappet and the backing plate comprised using a raised (male) feature on the tappet and a lowered (female) feature or features on the backing plate. This interface can also be characterized by a ratio. In an above example, a calculated 6 sigma statistical limit stack-up for the amount of movement possible in the brake between the pad and tappets was made. This stack-up was based on a number of brake system sub-components and their tolerance limits. The limits of these movement values (up/down, left/right) were then used to relate (via a ratio) the geometry of the interface features on the tappets and backing plate to shape/designs that will not contact in a dynamic condition. Deviating from the ratio may cause degraded performance or even damage to the air disc brake in some cases.

One aspect of these interface features (tappet feature mated to backing plate feature) is to avoid contact between them during dynamic braking operation. Contact between them can result in damage to the internal components of the brake, also known as the "inner mechanic." Therefore, a unique geometric relationship can be maintained; else, brake performance can suffer and damage to the brake may occur. Again, an optimum ratio between the tappet feature and the backing plate feature in a dynamic situation (i.e., during braking when one or more of the braking components can move) can avoid inner mechanic loading via relative movement of the features relative to one another. Using this ratio can also maximize the force transmission location between the tappet and backing plate while these move relative to one another. A unique shape achieving this can be driven by the ratio.

In summary, the total amount of "play" in the brake assembly (e.g., calculated via a stack-up of the tolerances/sizes of all the parts) and the size and shape of the tappet feature(s) work together to drive a minimum size/shape of the backing plate feature(s). This is done to make sure the tappet feature and the backing plate features do not touch and load the inner mechanic of the brake. The terms "ratio" and "association" used herein refer to the fact that if one changes one of the factors in the design (for example the tappet size), the size of the backing plate feature (recess) also scales relative/in a ratio to it. So, the relative sizes of the tappet and the backing plate recess are related in some fashion. For example, if the tappet has a protrusion of 12 mm, the backing plate recess would be sized according to this 12 mm tappet feature and the total play in the brake.

In one example embodiment, the outer diameter of the tappet is 65 mm, and the inner diameter of the step is ~38-39 mm. If the dimensions are different, the ratio concept can still apply (e.g., for an outer diameter of 70 mm and an inner diameter of 25 mm, the tappet feature size may also change). The area between the ~38-39 mm inner step diameter and the 65 mm outer diameter is where the clamping force transmission between the tappet and backing plate occurs in this example. During braking, this area is responsible for making sure the "clamping" portion of the braking event occurs properly.

In these embodiments, a unique geometry for an interface feature works in concert with the confines of this clamping force transmission area on the example tappet. The resulting geometry of each feature is designed in consideration to the clamping force transmission location on the tappet, within the confines of the ~38-39 mm "ring" for this example. However, the brake pad backing plate interface area is also configured to coincide with the unique movements encountered between all the components on the brake in static and dynamic conditions as well. In short, several factors combine to define the geometry of the tappet and backing plate mating features. These factors and their resulting geometry contribute to braking performance. All of these factors can be related through a ratio unique to the brake via a 6 sigma statistical stack-up of its components. If one factor changes, it affects the others.

Any suitable design ratio calculation can be used. In one example, an analysis of the total movement possible between the tappet and backing plate leads to the following for a certain scenario:

Tappet feature outer diameter (round)—18 mm
Pad Interface feature outer diameter (round)—28.5 mm
Vertical movement (up: 5.8 mm, down 5.8 mm)—11.6 mm total
Horizontal movement (right 2.8 mm, left 2.8 mm)—5.6 mm total
Resulting optimized ratio of tappet size to backing plate feature ~24 wide (23.6 calculated), ~30 mm high (29.6 calculated) rectangle.

This sizing allows the tappet feature size to always maintain the clearances (gaps) between it and the backing plate. The ratio approach permits the pad/all brake components to move within their 6 sigma statistical limits and not contact in a dynamic situation. The tappet feature and brake pad features can have at minimum the "gap" measurements according to their 6 sigma calculated values.

The following example is of how the size ratio is applied when the tappet feature size is reduced from 18 mm to 10 mm. To maintain the same "gap" between the components to never load the inner mechanic, the ratio is used again.

Tappet feature outer diameter (round)—10 mm
Pad interface feature: rectangle-sizing reflects the 10 mm tappet feature (16×22)
Resulting optimized ratio of tappet size to backing plate feature ~16 wide, ~22 mm high rectangle.
Vertical movement (up: 5.8 mm, down 5.8 mm) 11.6 mm
Horizontal movement (right 2.8 mm, left 2.8 mm) 5.6 mm
Resulting optimized ratio of tappet size to backing plate feature ~16 wide, ~22 mm high rectangle.

This illustrates that a reduction of the tappet feature geometry (e.g., from 18 mm to 10 mm) correlates in a ratio to a reduction in the back plate geometry (from 24 ×30 to 16×22) to maintain the same clearance gaps as before.

In the situation where a step-down tappet is used (see FIG. 3), the area between the inner diameter and outer diameter of the large diameter annular area of the tamper represents the clamping force transmission locations on the tappet placed in their static locations due to the overall brake design. The backing plate features fit inside the inner diameter of these rings. Their size is dictated by the "ratio."

In this example, the tappet protrusion has a diameter of 10 mm tappet, which fit into a 16 mm wide×22 mm tall backing plate feature, which works with the tappet features to prevent inner mechanic damage and provide for maximizing the force transmission location between the tappet and backing plate. This helps minimize stress and strain on the backing plate. If a larger shape is chosen for the backing plate feature, the largest shape and size that corresponds with the tappet feature size but still allows maximum force transmission area contact is the eye shape noted above. This eye shape represents the largest size/shape possible to maximize the force transmission location/area between the tappet and backing plate. And the eye shape connects back to the ratio/optimum design tappet and backing plate parameters. That is, the eye shape represents the largest size/shape possible to maximize the force transmission location/area between the tappet and backing plate, and a larger shape can result in a force transmission location/area between the tappet and backing plate that is reduced.

The optimum backing plate design shape can be used to geometrically find the largest backing plate design shape (i.e., the eye shape). This is the largest shape that can exist which will still allow a full or near full force transmission location/area between the tappet and backing plate. This shape is thereby linked to both the optimized force transmission area on the tappet as well as the ratio of tappet size to backing plate feature size calculated in an optimum design.

In another example, a formula can be used to determine the height and width of the backing plate recess from the diameter of the protrusion of the tappet. This formula can be used to avoid side loading the inner mechanic by maintaining some gap even at extreme brake assembly and pad movement. In this formula ("X" represents the diameter of the tappet protrusion), the height multiplier ratio is expressed as: $Y=(0.0048)*X^2-0.1988*X+3.7043$. To determine the height, the height multiplier ratio is multiplied by the tappet diameter: $Y*X \ldots (2.2)*(X)$. The width multiplier ratio is expressed as: $Y=(0.0024)*X^2-0.0994*X+2.3522$. To determine the width, the width multiplier ratio is multiplied by the tappet diameter: $Y*X \ldots (1.5982)*X$.

So, if the tappet feature diameter is known, the backing plate feature dimensions can be calculated using the formulas shown above. For example, in the case of a tappet protrusion diameter of 10 mm, the height multiplier ratio is expressed as: $Y=(0.0048)*(10)^2-0.1988*(10)+3.7043-2.2$. To determine the height, the height multiplier ratio is multiplied by the tappet diameter: $Y*X \ldots (2.2)*(10)=22$. So, 22 mm is the correct backing plate feature height. The width multiplier ratio is expressed as: $Y=(0.0024)*(10)^2-0.0994*(10)+2.3522=1.5982$. To determine the width, the width multiplier ratio is multiplied by the tappet diameter: $Y*X \ldots (1.5982)*(10)=15.982$ (round up to 16). So, 16 mm is the correct backing plate feature width. The equations stated above apply to a tappet protrusion diameter of 10 to 18 mm. Different height and width equations can accommodate other (e.g., 10 to 29 mm) tappet feature diameters.

In other examples:

The height of the recess is between approximately 2.2 and 2 times the diameter of the tappet for tappets features from 10 to 12 mm in diameter.

The height of the recess is between approximately 1.92 and 1.8 times the diameter of the tappet for tappets features from 13 to 15 mm in diameter.

The height of the recess is between approximately 1.75 and 1.67 times the diameter of the tappet for tappets features from 16 to 18 mm in diameter.

The width of the recess is between approximately 1.6 and 1.5 times the diameter of the tappet for tappets features from 10 to 12 mm in diameter.

The width of the recess is between approximately 1.46 and 1.4 times the diameter of the tappet for tappets features from 13 to 15 mm in diameter.

The width of the recess is between approximately 1.375 and 1.33 times the diameter of the tappet for tappets features from 16 to 18 mm in diameter.

In other examples:

The height of the recess is between 2.2 and 1.67 times the diameter of the tappet for tappets ranging from 10 to 18 mm in diameter.

The width of the recess is between 1.6 and 1.33 times the diameter of the tappet for tappets ranging from 10 to 18 mm in diameter.

In yet another example, which confirms the linear relationship between diameter, height, and width:

The height of the recess is 1.00 times the diameter of the tappet plus 12.00 mm. The width of the recess is 1.00 times the diameter of the tappet plus 6.00 mm.

In a further example, to capture the minimum and maximum sizes possible:

The height of the recess is between 2.2 and 1.41 times the diameter of the tappet for tappet features ranging from 10 to 29 mm in diameter.

The width of the recess is between 1.6 and 1.21 times the diameter of the tappet for tappet features ranging from 10 to 29 mm in diameter.

Referring back to paragraphs 34 and 35, in some embodiments, the recess 420 in the backing plate is sized to form fit with the protrusion 320 of the tappet 300 (i.e., the inner dimensions of the recess 420 equal (or about equal) the outer dimension of the protrusion 320). However as previously stated, there can be movement of the backing plate 400 and/or tappet 300 during braking, and a force applied by the protrusion 320 against the inner wall of the recess 420, or vice versa, can cause stress or damage to the backing plate 400, tappet 300, and/or other parts of the braking system. That is, contact/loading of the tappet on the backing plate, or vice versa, can causes damage in a dynamic state.

To account for this, in some embodiments, the inner dimensions of the recess 420 are greater than the outer dimensions of the protrusion 320 to provide some "play" to accommodate movement but in this case according to the limits of the ratio and tappet feature range. For example, the backing plate 500 in FIG. 5 has a circular recess 520 with a diameter is that slightly larger than the diameter of the protrusion of the tappet calculated according to the limits of the ratio and tappet feature range. While this design provides a relatively large area 510 to contact with the backing plate engagement portion of the tappet to engage the brake, it provides a relatively small clearance 525 (e.g., ~2.06 mm) for movement of the protrusion and/or backing plate 500 during braking, which may not be sufficient to accommodate such movement. In this example, ~2.06 mm mm is the smallest gap permitted to allow installation in a static or dynamic condition with a nominal dimensional condition for this design. This is calculated using the limits of the ratio and tappet feature range (10 to 29 mm). In this example, the smallest tappet feature ratio is 1.21 and the smallest tappet feature size is 10 mm. The resulting minimum tappet feature size becomes ~12.06 mm.

As another example, the backing plate 600 in FIGS. 6A and 6B has a circular recess 620 that is almost as large as the outer diameter of the tapper. In this example, this shape is the largest shape that can be permitted to allow installation in the static or dynamic condition with a nominal dimensional condition for this design. While this design provides the maximum clearance 625 for movement of the protrusion and/or backing plate 600 during braking, it provides a relatively small area 610 to contact the backing plate engagement portion of the tappet to engage the brake. Such a small area may not be sufficient to provide a threshold clamping force transmission to the backing plate 600 to brake the vehicle. In one example, the ratio may again be applied to calculating the maximum feature size relative to the maximum tappet feature size. This is calculated using the limits of the ratio and tappet feature range (10 to 29 mm). In this example, the largest tappet feature ratio is 2.2 and the largest tappet feature size is 29 mm. The resulting maximum tappet feature size becomes ~63.8 mm.

CONCLUSION

It should be understood that all of the embodiments provided in this Detailed Description are merely examples and other implementations can be used. Accordingly, none of the components, architectures, or other details presented herein should be read into the claims unless expressly recited therein. Further, it should be understood that components shown or described as being "coupled with" (or "in communication with") one another can be directly coupled with (or in communication with) one another or indirectly coupled with (in communication with) one another through one or more components, which may or may not be shown or described herein. Additionally, "in response to" can be directly in response to or indirectly in response to. Also, terms such as "generally," "substantially," or "about" can refer to a characteristic, parameter, or value that need not be exactly achieved, as deviations or variations (e.g., tolerances, measurement error, measurement accuracy limitations, etc.) may occur in amounts that do not preclude the effect the characteristic, parameter, or value was intended to provide.

It is intended that the foregoing detailed description be understood as an illustration of selected forms that the invention can take and not as a definition of the invention. It is only the following claims, including all equivalents, which are intended to define the scope of the claimed invention. Accordingly, none of the components, architectures, or other details presented herein should be read into the claims unless expressly recited therein. Finally, it should be noted that any aspect of any of the embodiments described herein can be used alone or in combination with one another.

What is claimed is:

1. An air disc brake backing plate comprising:
   a friction material coupled with a first side of the air disc brake backing plate; and
   a recess formed in a second side of the air disc brake backing plate, wherein the recess is sized larger than an outer perimeter of a protrusion on a tappet of a braking system, and wherein the recess is sized large enough that an inner wall of the recess will not contact an outer wall of a portion of the protrusion received in the recess as the air disc brake backing plate and/or tappet move during braking.

2. The air disc brake backing plate of claim 1, wherein the recess is rectangular in shape.

3. The air disc brake backing plate of claim 1, wherein the recess is eye shaped.

4. The air disc brake backing plate of claim 1, wherein the recess is sized to allow for a minimum amount of clamping force transmission from the tappet needed for braking.

5. The air disc brake backing plate of claim 1, wherein the recess is sized to allow a maximum amount of clamping force transmission from the tappet.

6. The air disc brake backing plate of claim 1, wherein:
the tappet comprises a stepped-down portion; and
the recess is sized small enough to prevent a transition to the stepped-down portion in the tappet from overlapping with a transition in the air disc brake backing plate to the recess during braking.

7. The air disc brake backing plate of claim 1, wherein the tappet and the protrusion form concentric circles.

8. The air disc brake backing plate of claim 1, wherein the protrusion and the recess comprise different shapes.

9. An air disc brake backing plate comprising:
a friction material coupled with a first side of the air disc brake backing plate; and
a recess formed in a second side of the air disc brake backing plate, wherein the recess is sized larger than an outer perimeter of a protrusion on a tappet of a braking system;
wherein:
a height of the recess is between 2.2 and 1.41 times a diameter of the protrusion;
a width of the recess is between 1.6 and 1.21 times the diameter of the protrusion; and
the diameter of the protrusion is between 10 and 29 mm.

10. A method for manufacturing an air disc brake backing plate for use in a braking system comprises a tappet having a protrusion, the method comprising:
determining a minimum size of a recess to manufacture in the air disc brake backing plate to accept the protrusion, wherein the minimum size is determined from predicted movement of the air disc brake backing plate and/or tappet during braking, such that an inner wall of the recess will not contact the protrusion as the air disc brake backing plate and/or tappet move during braking,
determining a maximum size of the recess, wherein the maximum size is determined from overlapping shapes generated by a simulation of the protrusion positioned in a plurality of locations in a shape formed from the determined minimum size of the recess; and
creating the recess in the air disc brake backing plate with the determined minimum and maximum sizes.

11. The method of claim 10, wherein the minimum size is determined by modeling a stack-up of tolerances of a plurality of components in the braking system.

12. The method of claim 11, wherein the modeling is performed using a six sigma analysis.

13. The method of claim 10, wherein the tappet and the protrusion form concentric circles.

14. The method of claim 10, wherein the protrusion and the recess comprise different shapes.

15. An air disc brake backing plate manufactured using the method of claim 10.

16. The air disc brake backing plate of claim 15, wherein the recess is rectangular in shape.

17. The air disc brake backing plate of claim 15, wherein the recess is eye shaped.

18. The air disc brake backing plate of claim 15, wherein:
a height of the recess is between 2.2 and 1.41 times a diameter of the protrusion;
a width of the recess is between 1.6 and 1.21 times the diameter of the protrusion, and
the diameter of the protrusion is between 10 and 29 mm.

* * * * *